United States Patent
Amann et al.

(10) Patent No.: US 8,561,203 B2
(45) Date of Patent: Oct. 15, 2013

(54) SIMULTANEOUS MIXED PROTECTION MODES OVER A VIRTUALIZED HOST ADAPTER

(75) Inventors: Stefan Amann, Boeblingen (DE); Gerhard Banzhaf, Nufringen (DE); Ralph Friedrich, Sindelfingen (DE); Raymond M. Higgs, Poughkeepsie, NY (US); George P. Kuch, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 13/149,127

(22) Filed: May 31, 2011

(65) Prior Publication Data
US 2012/0311716 A1 Dec. 6, 2012

(51) Int. Cl.
*G06F 21/00* (2013.01)
(52) U.S. Cl.
USPC .......................................................... 726/26
(58) Field of Classification Search
USPC ..................................................... 726/26–30
See application file for complete search history.

(56) References Cited

U.S. PATENT DOCUMENTS

| | | | |
|---|---|---|---|
| 2003/0212911 A1* | 11/2003 | Challener et al. | 713/202 |
| 2008/0126813 A1* | 5/2008 | Kawakami | 713/193 |
| 2010/0058155 A1* | 3/2010 | Wu | 714/807 |

* cited by examiner

*Primary Examiner* — Brandon Hoffman
*Assistant Examiner* — Anthony Brown
(74) *Attorney, Agent, or Firm* — Cantor Colburn LLP; Steven Chiu

(57) ABSTRACT

A method for supporting simultaneous mixed protection modes for a write operation. The method includes receiving a write request that includes write data, and is received from one of a plurality of requestors. At least one of the requestors does not support data integrity protection. It is determined if data integrity protection is required for the write operation. It is additionally determined if the data integrity protection is supported by the requestor. Once the determination is made, the data integrity protection value is calculated if data integrity protection is required and is not supported by the requestor. The write data is encoded with the data integrity protection value prior to being written. If the requestor supports data integrity protection, then data integrity protection values are applied to the write data prior to writing the data to the external storage.

20 Claims, 4 Drawing Sheets

US 8,561,203 B2

SIMULTANEOUS MIXED PROTECTION MODES OVER A VIRTUALIZED HOST ADAPTER

BACKGROUND

The present invention relates generally to protection modes over a fiber channel protocol, and specifically to the use of mixed protection modes simultaneously over a virtualized host adapter in a virtual machine environment.

Virtual computing allows multiple guest operating systems to execute simultaneously on a single hardware device. Each of the guest operating systems may include different versions of the same operating system, or different operating systems, with each of the operating systems supporting various levels and types of security and data integrity requirements. In some instances these guest operating systems are in communication with storage systems that store data that is needed by the operating systems.

Heterogeneous environments may exist where the same host may support various levels of data integrity protection. These environments may be required to communicate with external storage via virtualized host bus adapters implemented by the same physical adapter. Multiple physical adapters are needed to support the various requirements of the heterogeneous operating systems leading to additional cost and overhead.

SUMMARY

An embodiment includes a system including a computer processor configured to execute a mixed protection module. The mixed protection module receives a request for a write operation. The request received by the mixed protection module includes write data, and is received from one of a plurality of requestors. At least one of the requestors does not support data integrity protection. The system determines if data integrity protection is required for the write operation. The system additionally determines whether data integrity protection is supported by the requestor if data integrity protection is required. Once the determination is made, the system calculates a data integrity protection value if data integrity protection is required and is not supported by the requestor. The write data is encoded with the data integrity protection value prior to being written. If data integrity protection is supported by the requestor, then the data integrity protection values are applied to the write data prior to writing the data to the external storage. Then the system writes the data to an external storage device.

An additional embodiment includes a method for supporting simultaneous mixed protection modes for a write operation. The method includes receiving a write request that includes write data, and is received from one of a plurality of requestors. At least one of the requestors does not support data integrity protection. The method determines if data integrity protection is required for the write operation. The method additionally determines whether data integrity protection is supported by the requestor if data integrity protection is required. Once the determination is made, the method includes calculating a data integrity protection value if data integrity protection is required and is not supported by the requestor. The write data is encoded with the data integrity protection value prior to being written. If data integrity protection is supported by the requestor, then the data integrity protection values are applied to the write data prior to writing the data to the external storage. Then the method includes writing the data to an external storage device.

An embodiment includes a system including a computer processor configured to execute a mixed protection module. The mixed protection module receives a request for a read operation. At least one of the requestors does not support data integrity protection. The system determines if data integrity protection is required for the read operation. The system reads data from an external storage if it determines that data integrity protection is required. The system then determines if data integrity protection is supported by the requestor. If data integrity protection is not supported by the requestor, the system performs data validation on the data. The data validation is performed using a data integrity protection value that is encoded in the data prior to being stored in the external storage, and results of the validation are provided to the requestor along with the data. If the data integrity protection is supported by the requestor, then the data is forwarded to the requestor without performing data validation.

An additional embodiment includes a method for supporting simultaneous mixed protection modes for a write operation. The method includes receiving a request for a read operation. At least one of the requestors does not support data integrity protection. The method includes determining if data integrity protection is required for the read operation. The method additionally includes reading data from an external storage if it determines that data integrity protection is required. The method then determines if data integrity protection is supported by the requestor. If data integrity protection is not supported by the requestor, the method includes performing data validation on the data. The data validation is performed using a data integrity protection value that is encoded in the data prior to being stored in the external storage, and results of the validation are provided to the requestor along with the data. If the data integrity protection is supported by the requestor, then the data is forwarded to the requestor without performing data validation.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
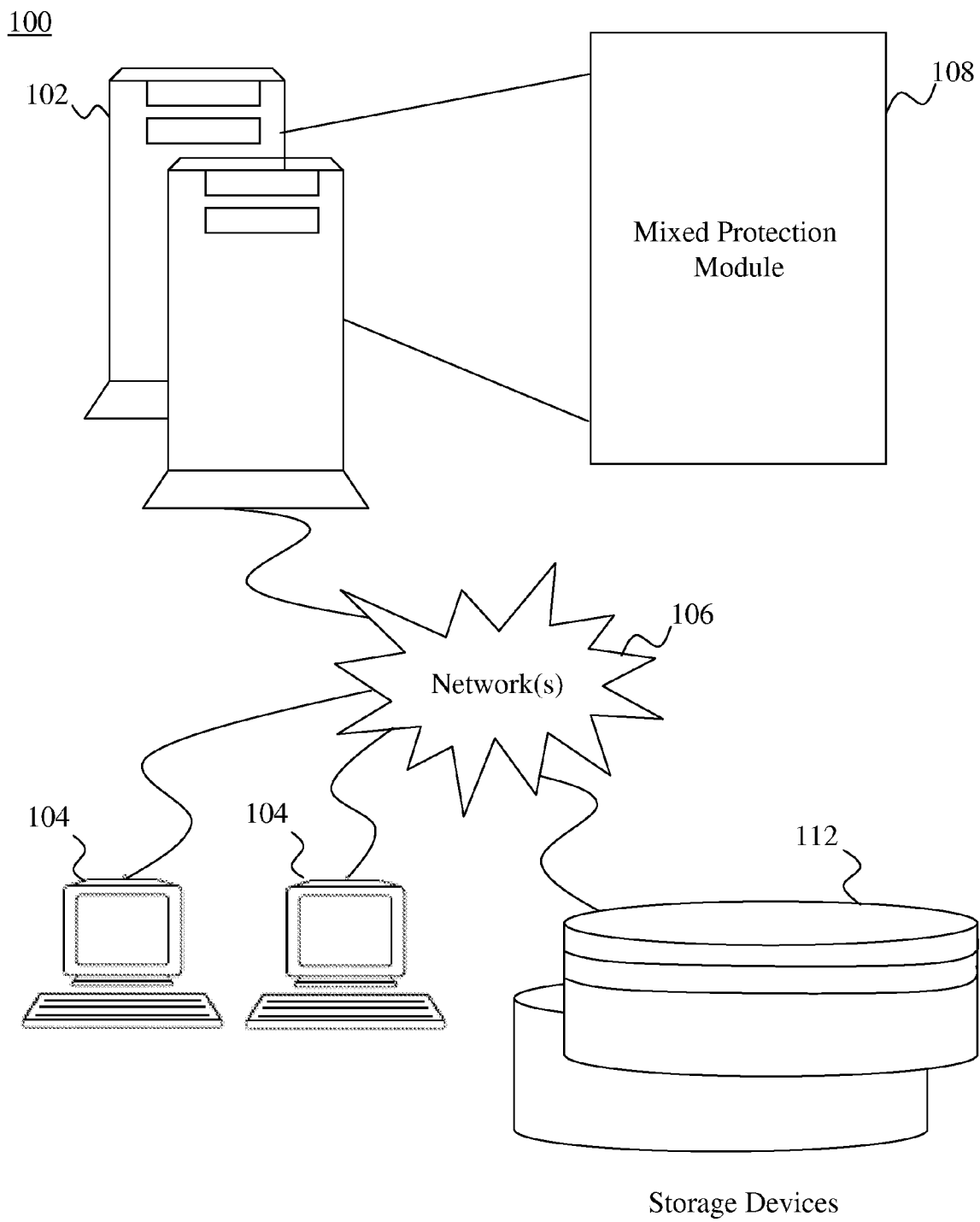
FIG. 1 illustrates a schematic diagram of a system for implementing simultaneous mixed protection modes over a virtualized host adapter in accordance with an embodiment.

In an embodiment, a number of heterogeneous guest operating systems are in communication with one or more storage area networks (SANs) with a plurality of data protection requirements over a single physical adapter. In an embodiment, at least one of the guest operating systems supports data integrity protection for data that is written to, or read from the one or more SANs. The SAN includes at least one external storage device that supports data integrity protection. The single physical adapter is a virtualized host adapter and supports multiple protection modes simultaneously based on the requirements of the guest operating systems, and the external storage devices. In an embodiment the guest operating system and the external storage device both support data integrity protection and the physical adapter passes the data integrity information between the guest operating system and the external storage device unchanged. In an embodiment, the guest operating system does not support data integrity protection, but the external storage device does support data integrity protection, and the physical adapter provides data integrity protection services for the guest operating system during read and write operations between the guest operating system and the external storage device using data provided by the guest operating system.

In an embodiment, the data integrity protection is provided using a standard data integrity protection protocol such as the T10 data integrity field (T10-DIF) standard. The T10-DIF standard requires the addition of an 8-byte control block to every 512 bytes of data transferred between a disk and an operating system. Typically both the operating system and the storage device need to support the data integrity protection method, and therefore the use of heterogeneous operating systems and/or storage devices would require separate hardware and/or software interfaces.

In an embodiment, the guest operating system passes a control block to the physical adapter for every read and write operation. The control block is a common control block regardless of the data integrity protection provided by the guest operating system or the external storage device. The virtual adapter interprets the content of the control block and invokes the appropriate algorithms based on the interpreted data. In an embodiment, the physical adapter hardware is configured as appropriate for the individual operation. In an embodiment, the user data and associated protection data is present on the link between the host and external device during all of the data transfers. For operating systems that do not support the data integrity protection natively, but would like to benefit from data integrity protection, the virtual adapter creates the control block for the operating system using information provided by the operating system in the read and write requests.

The level of protection for the specific read and write operations is controlled by an operation type field and is unique for reads/writes and the protection level. The protection level can be specified as no protection, Type A protection, Type B protection or any other type of protection as is known in the art.

In an embodiment, Type A protection requires the virtualized host adapter to generate protection information on data transfers from the host to the device. In addition, on data transfers from the device to the host, the adapter checks the protection information, and detects and reports errors. In the type A mode of protection, the transfer control block includes an operation type as will be described in more detail below.

In an embodiment, the control block additionally includes protection values. These protection values specify to the adapter the values to use in the protection data calculation algorithms. The adapter uses these values as starting values to increment as sequence numbers and/or constant values to compare during data transfer. In an embodiment, these values include an application tag value. For output operations, the application tag value is stored into the application field of each DIF data block that it generated by the virtualized host adapter. For input operations, this value is compared with the application tag field of each DIF block it receives from the device to validate that the data is accurate.

In an embodiment, the protection values include a reference tag value. For write operations, the reference tag value is used by the virtualized host adapter as the reference tag of the first DIF data block sent to the external storage device. The reference tag values of subsequent blocks are incremented by one. For read operations the reference tag value is used as the compare value for the reference tag of the first DIF data block received from the device. Subsequent blocks received are expected to have the reference tag value incremented by one. In an embodiment, the user data is provided to the adapter as contiguous data, or as a scatter/gather list as is known in the art.

In an embodiment, type B protection requires the host operating system provide protection data for write operations to the adapter. All protection data for reads will be verified by the host operating system. For type B protection the virtualized host adapter interleaves the user data and protection data. In the type B mode of protection the transfer control block includes an operation type as will be described in more detail below. In an embodiment, the control block additionally includes protection information. The protection data is enhanced by the adapter before being sent to the external storage device. In an embodiment, the protection information field is provided for any granularity of user data. In an embodiment the protection information includes a TCP/IP checksum, and the adapter verifies the integrity of a segment of user data based on this checksum prior to initiation of data transfer. In an embodiment, the checksum is converted to a CRC prior to being sent to the external storage. In an embodiment, the protection field information additionally includes a constant field for the use of the host OS. In an embodiment the data protection field further includes a reference tag which is a unique sequence number which identifies the segment of user data. For write operations the virtualized host adapter compares this value with the host generated value in each DIF block in order to determine if the data is valid. For input operations the virtualized host adapter uses this value as a compare value for the first DIF data block received from the device. Subsequent blocks received are expected to have the ref tag value incremented by one.

In an embodiment, the protection information additionally includes an application tag value. The virtualized host adapter compares this value with the host generated value in each DIF block for write operations to ensure data integrity. For read operations the virtualized host adapter compares this value with the application tag field of each DIF block it receives from the external storage device.

FIG. 1 illustrates a schematic diagram of a system 100 for implementing simultaneous mixed protection modes over a virtualized host adapter which will now be described. In an embodiment, the system 100 includes a host system computer 102 executing two or more guest operating systems communicating over a physical adapter using simultaneous mixed protection. Host system computer 102 may operate in any type of environment that is capable of executing a software application. Host system computer 102 may comprise a high-speed computer processing device, such as a mainframe computer, to manage the volume of operations governed by an entity for which the guest operating systems are executing. In an embodiment, the host system computer 102 is part of an enterprise (e.g., a commercial business) that implements the simultaneous mixed protection modes over a virtualized host adapter.

In an embodiment, the system 100 depicted in FIG. 1 includes one or more client systems 104 through which users at one or more geographic locations may contact the host system computer 102. The client systems 104 are coupled to the host system computer 102 via one or more networks 106. Each of the client systems 104 may be implemented using a general-purpose computer executing a computer program for carrying out the processes described herein. The client systems 104 may be personal computers (e.g., a lap top, a personal digital assistant, a mobile device) or host attached terminals. Client systems 104 may be other host system computers in communication with the host system computer 102. Client systems 104 may be operated by authorized users (e.g., programmers) for requesting data from the guest operating systems executing on the host system computer 102 and supporting simultaneous mixed protection modes over a virtualized host adapter as described herein.

The networks 106 may be any type of known network including, but not limited to, a wide area network (WAN), a local area network (LAN), a global network (e.g., Internet), a virtual private network (VPN), and an intranet. The networks 106 may be implemented using a wireless network or any kind of physical network implementation known in the art. One or more of the client systems 104 may be coupled to the host system computer 102 through multiple networks (e.g., intranet and Internet) so that not all client systems 104 are coupled to the host system computer 102 through the same network. One or more of the client systems 104 and the host system computer 102 may be connected to the networks 106 in a wireless fashion. In one embodiment, the networks 106 include an intranet and one or more client systems 104 execute a user interface application (e.g., a web browser) to contact the host system computer 102 through the networks 106. In another embodiment, one or more of the client systems 104 is connected directly (i.e., not through the networks 106) to the host system computer 102 and the host system computer 102 contains memory for storing data in support of simultaneous mixed protection modes over a virtualized host adapter.

In an embodiment, a storage device 112 is a SAN and includes one or more external storage devices accessible by the host system computer 102, as well as other data/information desired by the entity representing the host system computer 102 of FIG. 1. The storage device 112 is logically addressable as a consolidated data source across a distributed environment that includes networks 106. Information stored in the storage device 112 may be retrieved and manipulated via the host system computer 102 over a virtualized host adapter and/or the client systems 104. In an embodiment, the storage device 112 includes one or more databases containing data used by the one or more guest systems executing on the host system computer 102. It will be understood by those of ordinary skill in the art that the storage device 112 may also comprise other structures, such as an XML file on the file system or distributed over a network (e.g., one of networks 106), or from a data stream from another server located on one of the networks 106.

The host system computer 102 depicted in the system of FIG. 1 may be implemented using one or more servers operating in response to a computer program stored in a storage medium accessible by the server. The host system computer 102 may operate as a network server (e.g., a web server) to communicate with the client systems 104. The host system computer 102 handles sending and receiving information to and from the client systems 104 and can perform associated tasks. The host system computer 102 may also include a firewall to prevent unauthorized access to the host system computer 102 and enforce any limitations on authorized access. For instance, an administrator may have access to the entire system 100 and have authority to modify portions of the system 100. A firewall may be implemented using conventional hardware and/or software as is known in the art.

The host system computer 102 may also operate as an application server. The host system computer 102 includes one or more physical adapters for communication to the storage device 112. The host system computer 102 includes a mixed protection module 108 for managing data integrity protection for data written to or read from the storage device 112 in an embodiment. In an embodiment, the mixed protection module 108 is executed by the physical adapter. As previously described, it is understood that separate servers may be utilized to implement the network server functions and the application server functions. Alternatively, the network server, the firewall, and the application server may be implemented by a single server executing computer programs to perform the requisite functions.

Figure 2:
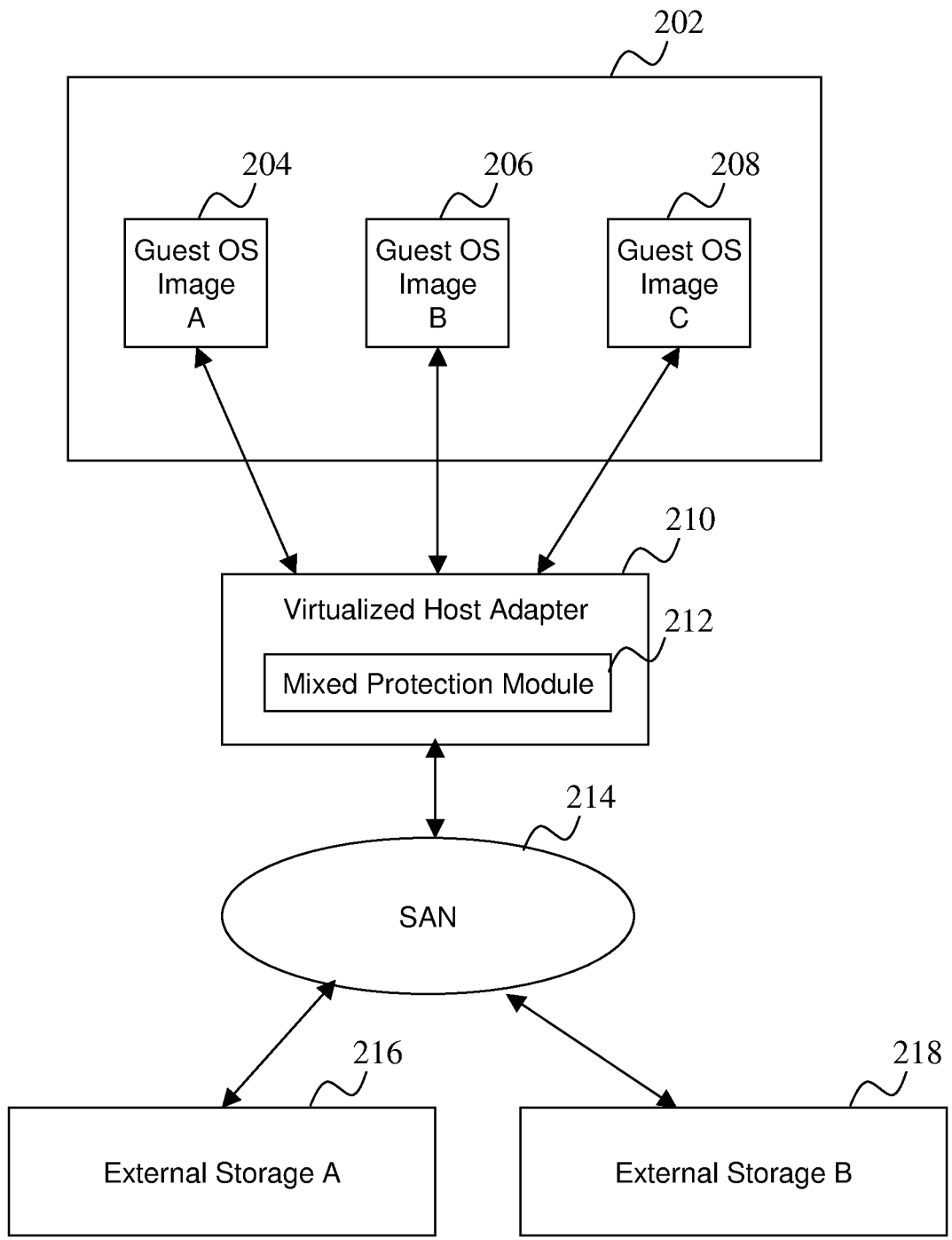
FIG. 2 illustrates a schematic diagram of the various components in a system for simultaneous mixed protection modes over a virtualized host adapter in accordance with an embodiment.

It will be understood that the mixed protection module 108 described in FIG. 1 may be implemented in hardware, software, or a combination thereof FIG. 2 illustrates a schematic diagram of the various components in a system for simultaneous mixed protection modes over a virtualized host adapter in accordance with an embodiment. A mixed protection mode system 200 includes a plurality of components. The mixed protection mode system 200 includes a host system 202. In an embodiment, the host system 202 is a host system computer capable of executing one or more virtual machines, such as the host system computer 102 of FIG. 1. The host system includes one or more virtual machine guest operating system images such as guest operating system image A 204, guest OS image B 206 and guest OS image C 208.

In an embodiment, the guest operating system image A does not support or require data integrity protection. In an embodiment, the guest operating system image B 206 supports data integrity protection natively and is in communication with an external storage that also supports data integrity protection. The guest operating system image C 208 does not support data integrity protection natively, but is in communication with an external storage device that supports data integrity protection, and data protection integrity protection is a preferred method of reading and writing data to the external storage by the system's administrator.

In an embodiment, each guest operating system (guest operating system image A 204, guest OS image B 206 and guest OS image C 208) communicates with an external storage device, such as external storage A 216, and external storage B 218 in a SAN 214. In an embodiment, the external storage A 216 supports data integrity protection, and the external storage B 218 does not. In an embodiment, each guest operating system communicates with the SAN 214 over a virtualized host adapter 210. In an embodiment, the virtualized host adapter 210 is a physical adapter, such as a fiber channel adapter in a fiber optic network. In an additional embodiment, the virtualized host adapter 210 is a software adapter that simulates the physical connection between the host system 202 and the SAN 214. In an embodiment, the virtualized host adapter 210 includes a mixed protection module 212. The mixed protection module 212 provides simultaneous mixed protection modes for read and write requests received from all of the guest operating system images, and the external storage devices that support or require data integrity protection, as will be described in more detail below.

It will be understood that the guest operating system and external storage configurations provided herein are simplified for purposes of clarity. In alternate embodiments, any other combination of guest operating system and external storage configurations, such as, for example, a homogeneous environment, may be used.

Figure 3:
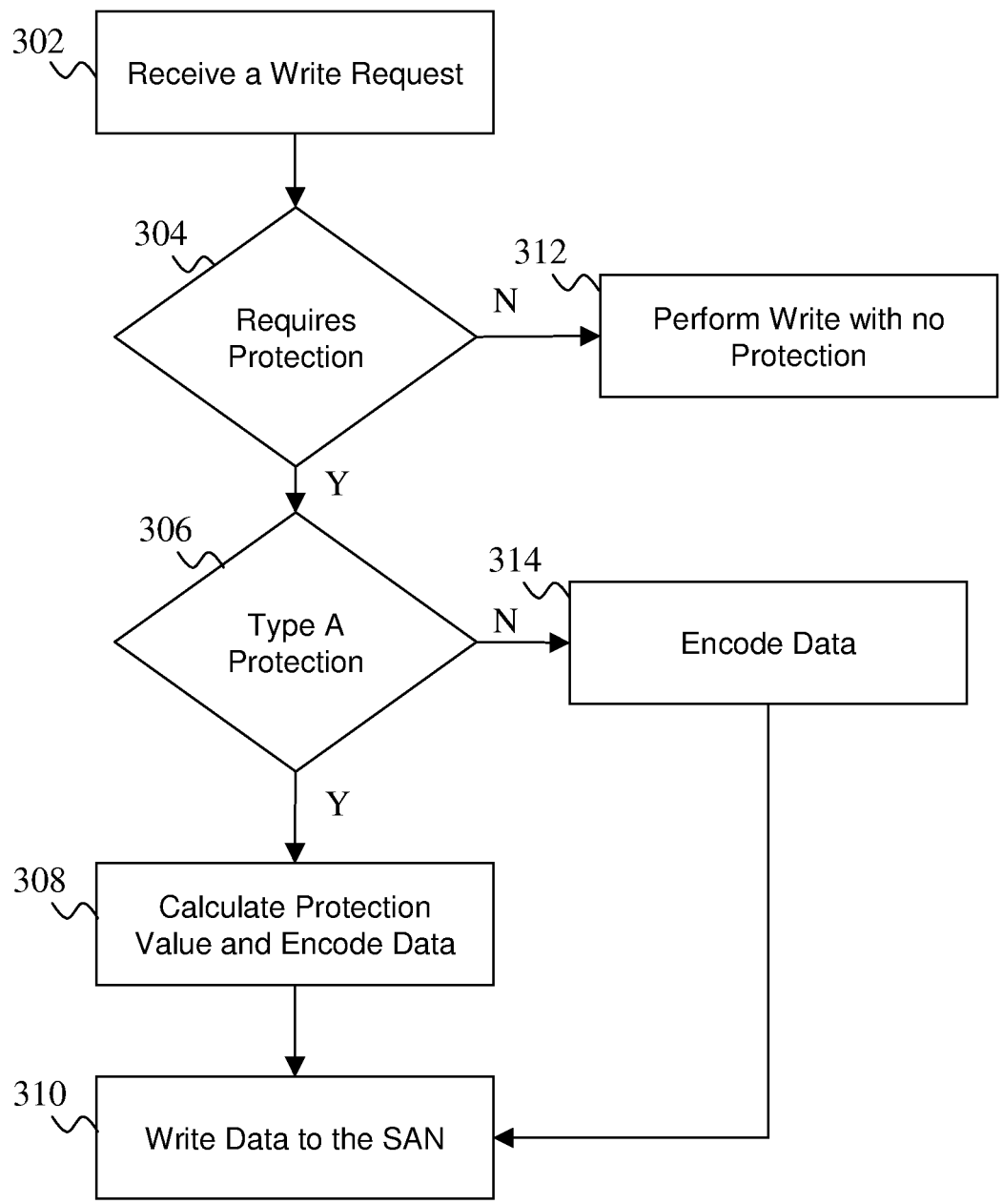
FIG. 3 illustrates a process flow of the writing of data to an external storage device over a virtualized host adapter in a mixed mode environment in an embodiment.

FIG. 3 illustrates a process flow of the writing of data to an external storage device over a virtualized host adapter in a mixed mode environment in an embodiment. In an embodiment, the process flow of FIG. 3 is executed by a mixed protection module, such as the mixed protection module 212 of FIG. 2. At block 302 a write request is received at the virtualized host adapter. In an embodiment the write request includes a block of data and a control block. In an embodiment the control block is compatible with the T10-DIF protocol. The control block includes several fields including an operation type field, one or more data protection control flags, an application tag value, a reference tag value, and a protection data length field.

The operation type field indicates if the operation is a read or write operation, and what level of protection is required. In an embodiment, for each read and write operation the protection level can be set as no protection, which indicates that no data integrity protection is required, type A protection, which requires the virtualized adapter to provide all data integrity protection services, or type B protection, which indicates that the guest operating system will provide all data integrity protection services on its own.

At block 304, it is determined if the write request requires protection. In an embodiment the operation type field is inspected to determine if the write operation requires protection or if no protection is required. If protection is required then at block 306 it is determined if the protection type required is type A protection. In an embodiment, the protection type is determined by inspecting the operation type field of the write request. If type A protection is required then at block 308 the virtualized host adapter calculates a data protection value and encodes the data using an encoding method as is known in the art. At block 310, the encoded data is written to the SAN.

Returning to block 306, if the data integrity protection type is not A, then at block 314, the data is encoded by the virtualized host adapter using the encoding data provided by the guest operating system. In an embodiment, the virtualized host adapter enhances the standard data integrity protection data supplied by the host system. The host DIF block provides the transmission control protocol/internet protocol (TCP/IP) checksum for the corresponding block of data that is to be saved in the external storage device. The adapter recalculates the TCP/IP checksum for the block of data and, in parallel, calculates an enhanced protection field, which is a 16 bit cyclic redundancy check (CRC). If the host provided TCP/IP checksum matches the adapter calculated checksum, the "enhanced" protection field (i.e., the CRC) replaces the TCP/IP checksum in the DIF field before the DIF field is sent on the SAN. At block 310, the data is written to the SAN. Returning to block 304, if the write request does not require protection, then the data is written to the SAN without data integrity protection at block 312.

Figure 4:
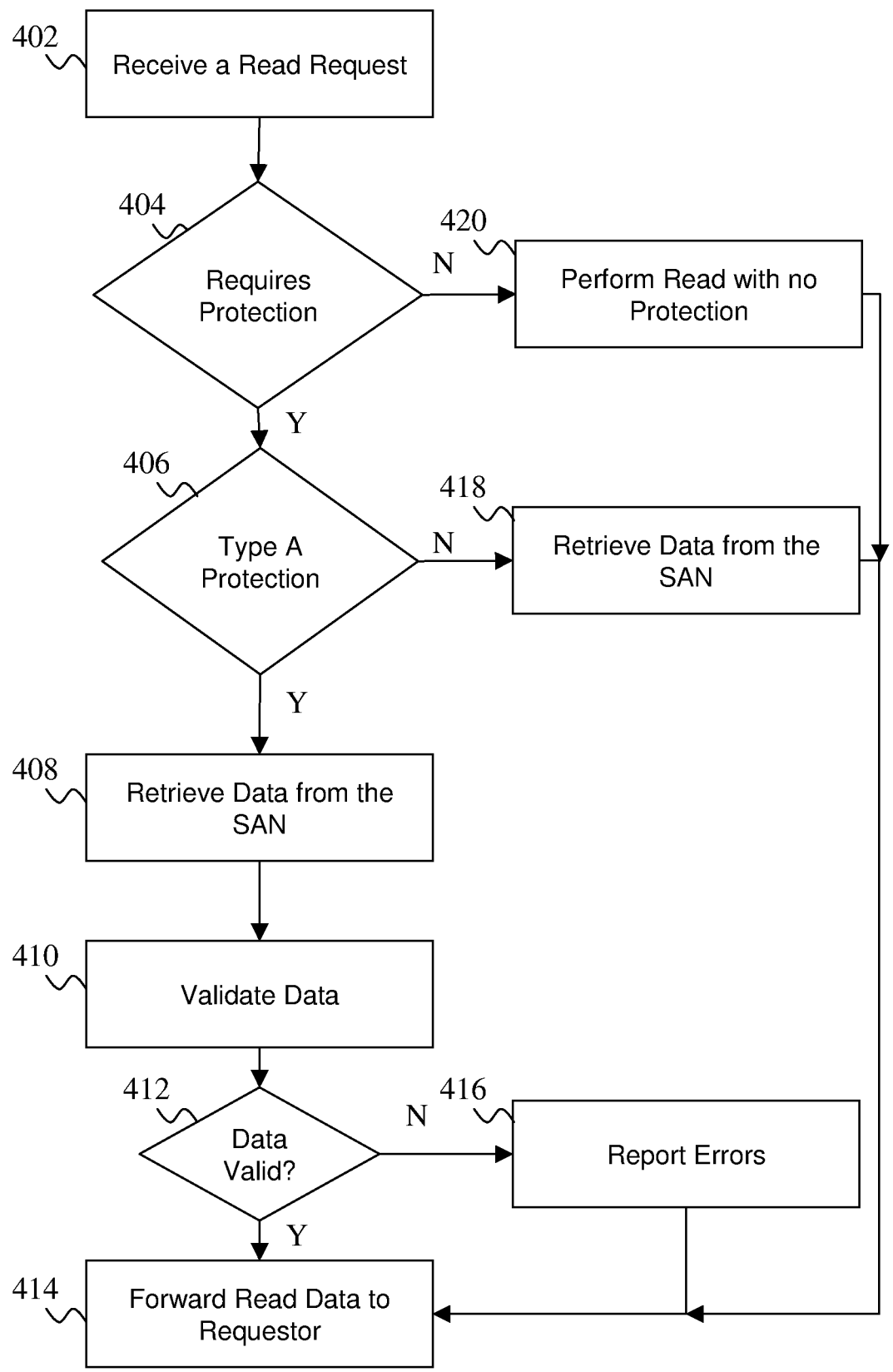
FIG. 4 illustrates a process flow of the reading of data from an external storage device over a virtualized host adapter in a mixed mode environment in an embodiment.

FIG. 4 illustrates a process flow of the reading of data from an external storage device over a virtualized host adapter in a mixed mode environment in an embodiment. At block 402, a read request is received. At block 404, it is determined if the read requires data integrity protection. If data integrity protection is required then processing continues at block 406. At block 406, it is determined if the data protection type is A. If the data protection type is A, then processing continues at block 408. At block 408 the data is retrieve from the SAN. In an embodiment, the data is retrieved based on an address in the read request. At block 410, the virtualized host adapter inspects the data retrieved from the SAN to validate the data. In an embodiment, the data is validated based on data integrity information in a data integrity field stored previously with the data. In an additional embodiment, the data integrity is verified using an ECC as is known in the art.

At block 412, if the data is valid, the data is forwarded from the virtualized host adapter to the requestor at block 414. If the data is not valid then processing continues at block 416. In an embodiment, at block 416, errors in the data are reported to the requestor along with the data returned from the SAN.

Returning to block 406, if the protection type is not type A, then the data is retrieved from the SAN at block 418. In an embodiment, the virtualized host adapter verifies the data was received correctly based on the DIF field received from the external storage, and then replaces the CRC field that it placed in the DIF field with the checksum calculated from the TCP/IP checksum received from the host system. At block 414 the data is forwarded to the requestor, and any errors detected in the return data are reported to the requestor. Returning to block 404, if data integrity protection is not required then the data is read from the SAN without data integrity protection at block 420 and, at block 414 the data is returned to the requestor.

The encoding and data integrity protection methods above were described with regard to the T10-DIF standard, it will be understood that any other method of data integrity protection is supported within the virtualized host adapter. Furthermore, any combination of additional data integrity protection, and encoding methods may be implemented simultaneously over the same virtualized host adapter.

Technical effects and benefits include a single virtualized host adapter capable of supporting any number of data integrity protection mechanisms in a heterogeneous virtual machine environment. Another benefit is the ability to perform data integrity protection at the virtualized host adapter even for guest operating systems that don't natively support data integrity protection. A further benefit is the ability to enhance data integrity using the virtualized host adapter for modes where the host system provides the data integrity information natively.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be constructed to maintain the proper protection for the invention first described.

What is claimed is:
1. A system comprising:
a computer processor configured to execute a mixed protection module at a virtualized host adapter, the virtualized host adapter configured to communicate with a plurality of guest operating system images, the guest operating system images configured to execute on a plurality of virtual machines, and at least one of the guest operating system images lacking support for data integrity protection, the mixed protection module performing:
receiving a request for a write operation from a requestor, the request including write data, and the requestor one of the guest operating system images;
determining whether data integrity protection is required for the write operation;
determining whether data integrity protection is supported by the requestor responsive to determining that data integrity protection is required for the write operation;
calculating a data integrity protection value responsive to determining that data integrity protection is required but unsupported by the requestor, the write data encoded with the data integrity protection value prior to writing the data;

applying data integrity protection values to the write data prior to writing the data responsive to determining that the data integrity protection is supported by the requestor, the data integrity protection value provided by the requestor; and writing the data to an external storage device.

2. The system of claim 1, wherein the data integrity protection value is calculated from data provided in the write request.

3. The system of claim 1, wherein the data integrity protection values provided by the requestor are enhanced by the mixed protection module.

4. The system of claim 1, wherein the requestor does not require data integrity protection, and the data is written directly to the external storage device without data integrity protection.

5. The system of claim 1, wherein the data integrity protection value provided by the requestor includes a transmission control protocol/internet protocol (TCP/IP) checksum.

6. The system of claim 5, wherein the TCP/IP checksum is replaced by a 16 bit cyclic redundancy check (CRC) value, and CRC value is applied to the write data prior to writing the data.

7. A method comprising:
receiving a request for a write operation from a requestor, the receiving at a virtualized host adapter that is configured to communicate with a plurality of guest operating system images executing on a plurality of virtual machines, the request including write data, the requestor one of the guest operating system images and at least one of the guest operating system images lacking support for data integrity protection;
determining whether data integrity protection mode is required for the write operation;
determining whether data integrity protection is supported by the requestor responsive to determining that data integrity protection is required for the write operation;
calculating a data integrity protection value responsive to determining that data integrity protection is required but unsupported by the requestor, the write data encoded with the data integrity protection value prior to writing the data;
applying data integrity protection values to the write data prior to writing the data responsive to determining that the data integrity protection is supported by the requestor, the data integrity protection value provided by the requestor; and
writing the data to an external storage device.

8. The method of claim 7, wherein the data integrity protection value is calculated from data provided in the write request.

9. The method of claim 7, wherein the data integrity protection values provided by the requestor are enhanced by the mixed protection module.

10. The method of claim 7, wherein the requestor does not require data integrity protection, and the data is written directly to the external storage device without data integrity protection.

11. The method of claim 7, wherein the data integrity protection value provided by the requestor includes a transmission control protocol/internet protocol (TCP/IP) checksum.

12. The method of claim 11, wherein the TCP/IP checksum is replaced by a 16 bit cyclic redundancy check (CRC) value, and CRC value is applied to the write data prior to writing the data.

13. A system comprising:
a computer processor configured to execute a mixed protection module at a virtualized host adapter, the virtualized host adapter configured to communicate with a plurality of guest operating system images, the guest operating system images configured to execute on a plurality of virtual machines, and at least one of the guest operating system images lacking support for data integrity protection, the mixed protection module performing:
receiving a request for a read operation from a requestor, and the requestor one of the guest operating system images;
determining that data integrity protection is required for the read operation;
reading data from an external storage responsive to determining that data integrity protection is required;
determining whether data integrity protection is supported by the requestor;
performing data validation on the data responsive to determining that data integrity protection is required but unsupported by the requestor, the data validation performed using a data integrity protection value, the data integrity protection value encoded in the data prior to being stored in the external storage, and results of the validation provided to the requestor along with the data; and
forwarding the data to the requestor without performing data validation responsive to determining that the data integrity protection is supported by the requestor.

14. The system of claim 13, wherein the data validation is performed using values provided by in the read request.

15. The system of claim 13, wherein the data integrity protection mode is determined by data in the read request.

16. The system of claim 13, wherein the read data includes a 16 bit cyclic redundancy check (CRC) value, and the CRC value is verified prior to the forwarding, the CRC value replaced with a transmission control protocol/internet protocol checksum responsive to determining that the CRC value is valid.

17. A method comprising:
receiving a request for a read operation from a requestor, the receiving at a virtualized host adapter that is configured to communicate with a plurality of guest operating system images executing on a plurality of virtual machines, the requestor one of the guest operating system images, and at least one of the guest operating system images lacking support for data integrity protection;
determining that data integrity protection is required for the read operation;
reading data from an external storage device responsive to determining that data integrity protection is required;
determining whether data integrity protection is supported by the requestor;
performing data validation on the data responsive to determining that data integrity protection is required but unsupported by the requestor, the data validation performed using a data integrity protection value, the data integrity protection value encoded in the data prior to being stored in the external storage, and results of the validation provided to the requestor along with the data; and
forwarding the data to the requestor without performing data validation responsive to determining that the data integrity protection is supported by the requestor.

18. The system of claim 16, wherein the data validation is performed using values provided by in the read request.

19. The system of claim 16, wherein the data integrity protection mode is determined by data in the read request.

20. The system of claim 16, wherein the read data includes a 16 bit cyclic redundancy check (CRC) value, and the CRC value is verified prior to the forwarding, the CRC value replaced with a transmission control protocol/internet protocol checksum responsive to determining that the CRC value is valid.

* * * * *